Dec. 30, 1952 — J. L. GLUNT ET AL — 2,623,722
EYEGLASS HOLDER
Filed June 27, 1949
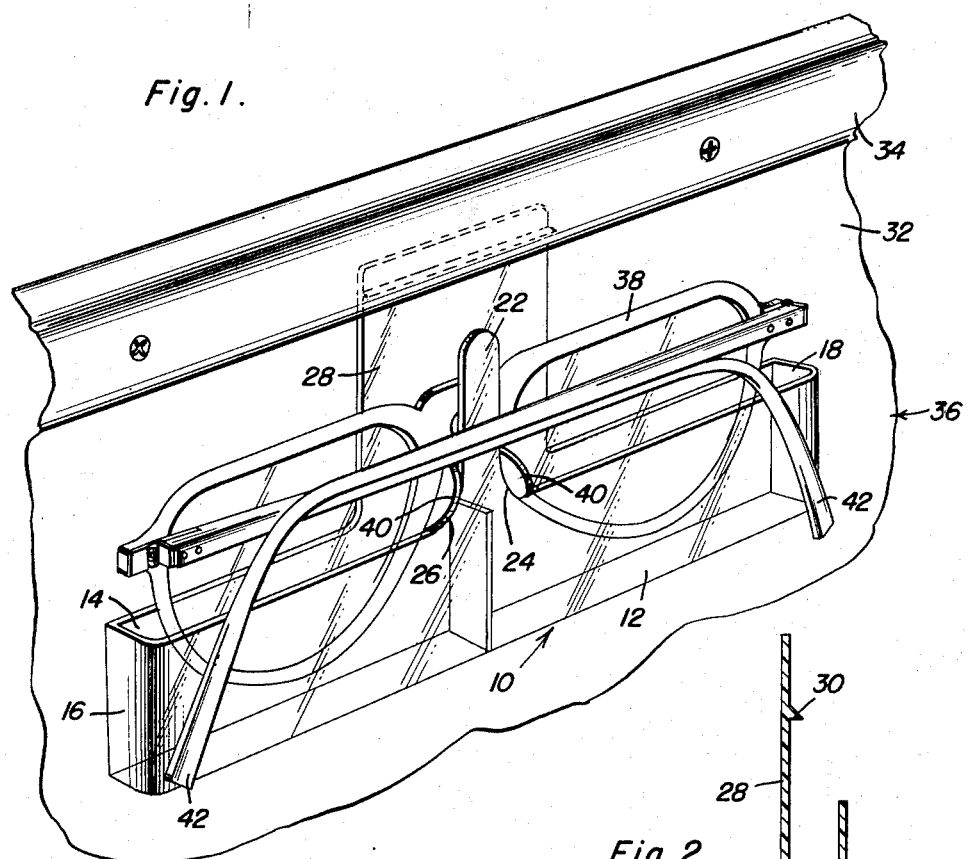
Fig. 1.
Fig. 2.
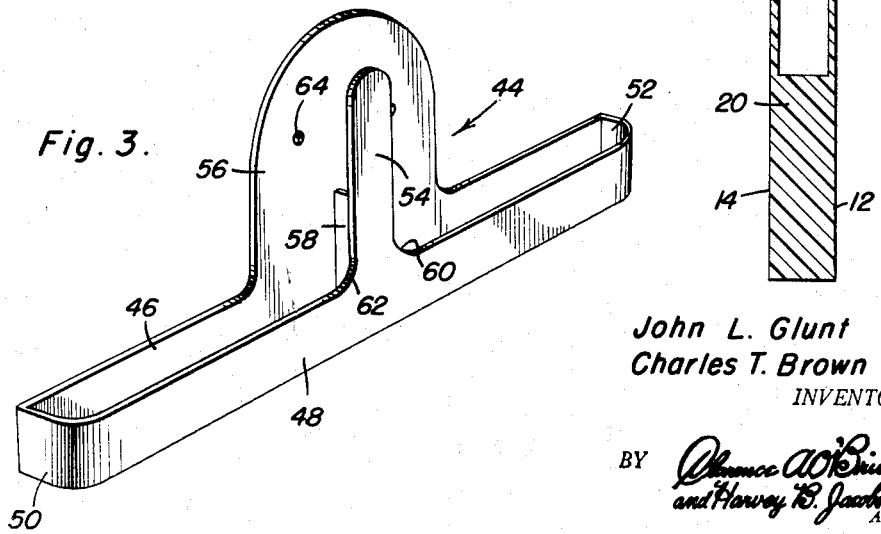
Fig. 3.
John L. Glunt
Charles T. Brown
INVENTORS Patented Dec. 30, 1952

2,623,722

UNITED STATES PATENT OFFICE 2,623,722

EYEGLASS HOLDER

John L. Glunt and Charles T. Brown,
Roaring Spring, Pa.

Application June 27, 1949, Serial No. 101,638

3 Claims. (Cl. 248—300)

This invention relates to new and useful improvements in eyeglass holders and the primary object of the present invention is to provide a small and compact eyeglass holder that is quickly and readily applied to or removed from a part of a vehicle in a convenient manner.

Another important object of the present invention is to provide an eyeglass holder that is molded in a single operation whereby the same can be produced at a cost beneficial to the purchasing public.

A further object of the present invention is to provide an eyeglass holder so constructed as to support eyeglass frames in a conveniently accessible position and which holder includes an open bottom to restrict the collecting of dust that would ordinarily collect upon the lenses of an eyeglass frame.

A still further aim of the present invention is to provide an eyeglass holder of the aforementioned character that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary perspective view of a portion of a vehicle and showing the present invention applied thereto and in use for supporting an eyeglass frame;

Figure 2 is a transverse vertical sectional view of the present invention the eyeglass frame removed therefrom; and, Figure 3 is a perspective view of the present eyeglass holder in slightly modified form.

Referring now to the drawings in detail, wherein for the purpose of illustration, there is disclosed a preferred embodiment of the present invention, the numeral 10 represents a hollow member of preferably plastic material, having an outer substantially rectangular side wall 12 and an inner substantially rectangular side wall 14. The ends of the side walls 12 and 14 are joined by end walls 16 and 18. The central portion of the side walls 12 and 14 are spaced relative to each other by a strengthening and reinforcing plate 20.

Rising from the upper edge and central portion of the outer side wall 12 is a supporting lug or plate 22 having lower concaved side edges 24 and 26 that merge with the upper edge of the outer side wall 12.

Rising from the upper edge and central portion of the rear or inner side wall 14 is a substantially rectangular bearing member or plate 28 of a width and length greater than the width and length of the lug 22.

A rib 30, substantially right-triangular in cross section, is provided on the inner face of the bearing member 28 and this rib 30 constitutes a wedge whereby the bearing member 28 may be forced between a side panel 32 and molding strips 34 of a vehicle door 36.

The above described eyeglass holder is molded in a single operation and its open bottom will tend to restrict the collecting of dust. It is preferred that the holder be constructed of a plastic material as this material has been found to be light in weight, durable and inexpensive.

In practical use of the present invention, an eyeglass frame 38 is placed between the side walls 12 and 14 with the nose pieces 40 of the eyeglass frame 38 resting upon the concaved edges 24 and 26 of the lug 22. The eyeglass frame 38 is thereby supported solely by the lug 22 and more particularly the concaved edges 24 and 26. Since most nose pads 40 are curved at a constant degree the edges 24 and 26 will be similar for all eyeglass frames. However, the curvature of the edges 24 and 26 may be changed without departing from the scope of the present invention. Then too, eyeglass frames having swingable nose pads will conform to the edges 24 and 26 by merely placing the nose pads against the edges 24 and 26.

It is intended that the ear pieces 42 be disposed outwardly of the side walls 12. However, the space between the walls 12 and 14 is such that the ear pieces 42 could be disposed between the walls 12 and 14 if desired. By so placing the ear pieces 42 between the walls 12 and 14, the eyeglass frame 38 and the ear pieces 42 will cooperate to clamp themselves against the lug 22.

Attention is next directed to Figure 3 wherein there is disclosed the present invention in slightly modified form. In this embodiment, the plastic holder 44 is constructed in a single operation and includes spaced inner and outer side walls 46 and 48 that are joined at their ends by end walls 50 and 52.

A supporting lug 54 rises from the upper edge and central portion of the outer side wall 48 and a bearing wall or member 56 rises from the upper edge and central portion of the inner side wall 46. It being noted that the bearing wall 56 is of an area greater than the area of the supporting lug 54.

A strengthening web 58 is integrally formed with the side walls 46, 48, the lugs 54 and the bearing wall 56.

The lug 54 is provided with concaved lower side edges 60 and 62 that merge with the upper edge of the side wall 48 and the bearing member 56 is provided with a plurality of apertures 64 for receiving suitable fasteners.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. As a new article of manufacture an eyeglass holder comprising an elongated hollow body having an open bottom, an inner vertical side wall and an outer vertical side wall, said side walls being joined at their ends, a strengthening plate joining the central portions of said side walls, a lug rising from the outer side wall and having concaved side edges at its juncture with said outer side wall, a flat bearing wall rising from and coplanar with the inner side wall, and a horizontal rib on said bearing wall below the upper end of said bearing wall adapted to be wedged between a molding strip and the panel of a vehicle door.

2. An eyeglass holder comprising an elongated member having an open bottom to reduce the dust collecting surfaces of the member, said member including forward and rear walls joined at their ends and retained in spaced relationship, a flat bearing plate extending upwardly from said rear wall and having a flat rear face flush with the rear face of said rear wall, whereby the plate and the rear wall will rest against a flat vertical surface, a lug formed with and extending upwardly from the forward wall medially the ends of the forward wall and facing the plate, said lug having concave side edges at its juncture with the upper edge of the forward wall, and a vertically disposed strengthening member disposed between and fixed to the central portions of said walls and also fixed to said plate and said lug.

3. The combination of claim 2, and a horizontal rib provided on the forward face of said plate intermediate the upper and lower ends of the plate and located well above said strengthening member for wedging engagement between a molding strip and panel of a vehicle door.

JOHN L. GLUNT.
CHARLES T. BROWN.

REFERENCES CITED

The following references are of record in the file of this patent:

UNITED STATES PATENTS

| Number | Name | Date |
|---|---|---|
| 993,404 | Price | May 30, 1911 |
| 2,202,242 | Wortham | May 28, 1940 |
| 2,241,205 | Kimber | May 6, 1941 |
| 2,273,492 | Malmer | Feb. 17, 1942 |
| 2,299,443 | Walmsley | Oct. 20, 1942 |